Patented May 31, 1949

2,472,017

UNITED STATES PATENT OFFICE 2,472,017

FOOD PRESERVATION

Frank L. Iungerich, Webster Groves, Mo., assignor to William Peche, St. Louis, Mo.

No Drawing. Application September 12, 1946, Serial No. 696,614

7 Claims. (Cl. 99—154)

This invention relates to the treatment of vegetables and fruits to prevent their discoloration in a manner to cause no other perceptible change in their raw and natural condition, and has a useful and practical embodiment in the treatment of potatoes, whereby the tuber may be peeled, and sized if desired, then treated and marketed in appropriate individual packages, ready for the pot or skillet.

The marketing of fruits and vegetables in a form in which they are fully prepared for cooking has gained favor in recent years. This is exemplified by the tremendous sales of canned and frozen foods of this character, in and out of season, where their only recommendation seems to be the time saved as compared to the use of fresh commodities as they come from the gardens and orchards. The marketing of potatoes in ready-prepared form is desirable, and except for discoloration when peeled or cut, is highly practicable since they may be kept fresh at room temperatures for a relatively long period.

This discoloration is the result of oxidation in the atomsphere aided by actinic rays and induced by enzymic action from enzymes in the vegetable or fruit, according to scientifically accepted theory. It has been known that the discoloration could be inhibited by destruction of the enzymes, and suggestions can be found in the literature of the art for accomplishing this purpose. But none of these suggestions, so far as is known, are practical for the prservation of such foods in their raw and natural condition, nor have they been sufficiently promising to justify their use commercially. Such suggested processes have been either too expensive or have materially changed the structure of the material, and in all cases have contemplated the use of reagents which do not have the status of foods. Some of them are known to be deleterious, but all of them are objectionable.

The object, therefore, of the present invention is to provide a method of treating fruits and vegetables, such as potatoes, which are subject to discoloration, by inactivating the responsible enzymes to a satisfactory depth without making any other obvious change in the raw and natural condition of the foods, by the use only of a reagent or reagents which are healthful foods or food ingredients.

The reagents employed by the present invention are dilute acetic acid, preferably in the form of vinegar, such as cider, wine or malt vinegar, fit for table use, and sodium chloride, or common salt. The latter is an indispensable food element without which a human being cannot survive, while vinegar has been a food ingredient since the world acquired cooks, and too early for its beginning to be recorded in history.

The invention consists essentially in treating the food with heat in the presence of dilute acetic acid preferably with sodium chloride, for a minimum period of time, sufficient to inactivate the enzymes responsible for discoloring, but insufficient to cause any obvious change in the raw and natural character of the food.

An example of the treatment is related, first, because of its simplicity. An aqueous solution is prepared with 3% acetic acid and 0.85% sodium chloride. This solution is heated, preferably to the boiling point, and the raw vegetable or fruit then immersed in it for a period of 10 to 20 seconds, after which the same is withdrawn and allowed to drain and dry. The surplus moisture may be evaporated at room temperature or in a blast of warmed air.

A second example, somewhat more complex because it is a two-step process, is nevertheless preferred. It employs the same reagents and basically is the same. An aqueous solution containing 5% acetic acid and 0.85% sodium chloride is maintained at room temperature. The peeled potatoes, for example, are immersed in this solution for 15 to 20 minutes, after which they are removed and without draining or drying are immersed in boiling water containing approximately 1% sodium chloride for 5 seconds.

In both cases the treatment is carried on by heat in the presence of acetic acid and salt. The second example is preferred because it is less offensive to workmen employed in dipping, there is less loss of acetic acid and there are smaller traces of taste and odor of acetic acid or vinegar left clinging to the finished product. Boiling dilute acetic acid, or vinegar, gives off pungent fumes disagreeable to those working around it, and also causes material losses in the reagent.

It will be noticed that acetic acid solution of 3% and 5% are specified. This is to be compared to commercial vinegars which are usually 5% acetic acid. Thus, in the one case, a dilute vinegar is used with added salt, and in the other case vinegar of usual strength is employed, but also with salt. In this connection it may be stated that an acetic acid strength of at least 3% is required for best results but that a much higher strength may be used with improved results, except that the residue of a strong solution remaining in the treated goods leaves a more pronounced taste and odor of vinegar and is therefore undesirable. In the second example, since the second step tends to remove much of the residue, a 5% rather than a 3% acid solution is employed, and this permits a substantial reduction in the time of heat application.

Passable results are obtained without the use of salt, but this reagent improves it. The salt hastens the reaction and apparently allows better penetration of the treating solution and therefore deepens the layer in which the enzymes are inactivated. The use of salt seems to be responsible for an improved result in the goods.

Attention may be called to the fact that the salt solutions employed, 0.85%, is a physiological saline solution.

There is no doubt but that heat less than 100° C. may be employed with passable results, but the time of application would have to be increased and this is objectionable because it would begin to convert the food. Applicant finds the most desirable results are obtained by the use of maximum heat with minimum time of application since this gives the least change to the structure.

The previous examples have been found satisfactory in treating peeled potatoes. It may be pointed out, however, that potatoes differ in their tendency to discoloration, and also in their response to treatment. This is because the potatoes differ as to varieties and differ as to conditions of growing under different climates and in different soils. It may be understood, therefore, that in order to get uniform results the treatment may be varied as to times and strengths of solution, to accommodate different grades of tubers.

It may also be pointed out that the treated potatoes may be kept in salable condition for a substantial length of time by maintaining them at room temperatures, above 40° F.

Potatoes have been specifically mentioned because it is apparent the process has commercial importance in its application to that vegetable. Other vegetables may be similarly treated, for example, cucumbers, eggplants, rutabagas and turnips. Fruits may also be treated to advantage. Apples are an example of one fruit to which the process seems to offer commercial possibilities, especially since the fruit is not satisfactorily preserved by canning or by freezing. Unskinned bananas may be treated with this process and held for a substantial period of time at their most enticing color, without affecting their deep ripening.

It is obvious from the foregoing description, within the scope of the appended claims, that various changes may be made in the details of applying the invention without departing from its spirit, and that parts of the invention may be used without the whole and improvements added while retaining its benefits.

I claim:

1. The method of treating a raw food of a class consisting of fresh fruits and vegetables which have a tendency to discolor by enzymic action when exposed to the air, comprising inactivating those enzymes on the surface thereof which tend to cause discoloration, by the application of heat to same in the presence of acetic acid for a short period in the order of seconds and insufficient to cause any obvious change in the structure of the food, and then removing the same from contact with said acid.

2. The method of treating a raw food of a class consisting of fresh fruits and vegetables which have a tendency to discolor by enzymic action when exposed to the air, comprising inactivating those enzymes on the surface thereof which tend to cause discoloration, by immersing the same in boiling water and with acetic acid and sodium chloride for a short period in the order of seconds and then removing the same from the water.

3. The method of treating a raw food of a class consisting of fresh fruits and vegetables which have a tendency to discolor by enzymic action when exposed to the air, comprising inactivating those enzymes on the surface thereof which tend to cause discoloration, by placing the same in a solution of acetic acid having at least a 3% strength and applying heat at approximately 100° C. for a period of seconds and then removing the same from the solution.

4. The method of treating raw food of a class consisting of fresh fruits and vegetables which have a tendency to discolor by enzymic action when exposed to the air, comprising inactivating those enzymes on the surface thereof which tend to cause discoloration, by placing the same in an aqueous solution of approximately 3% acetic acid for a period of 10 to 20 seconds at approximately 100° C. and then removing the same from the solution.

5. In the art of preserving raw food of a class consisting of fresh fruits and vegetables which have a tendency to discolor by enzymic action when exposed to the air, consisting in inactivating those enzymes which tend to cause discoloration, by immersing the same in an aqueous solution of approximately 3% acetic acid and 1% sodium chloride at approximately 100° C. for a period of 10 to 20 seconds and then removing the same from the solution.

6. The method of treating raw food of a class consisting of fresh fruits and vegetables which have a tendency to discolor by enzymic action when exposed to the air, comprising inactivating those enzymes on the surface thereof which tend to cause discoloration, by placing the same in an aqueous solution of approximately 5% acetic acid for 15 to 20 minutes at room temperature, and then immersing the same in boiling water for a period of approximately 5 seconds and then removing the same from the solution.

7. The process of treating raw food of a class consisting of fresh fruits and vegetables which have a tendency to discolor by enzymic action when exposed to the air, comprising inhibiting those enzymes which tend to cause discoloration, by placing the same in an aqueous solution of approximately 5% acetic acid and approximately 1% sodium chloride for 15 to 20 minutes, and then immersing the same in a boiling aqueous solution of approximately 1% sodium chloride for a period of approximately 5 seconds and then removing the same from the solution.

FRANK L. IUNGERICH.

REFERENCES CITED

The following references are of record in the file of this patent:

UNITED STATES PATENTS

| Number | Name | Date |
| --- | --- | --- |
| 93,841 | Smith | Aug. 17, 1869 |
| 723,693 | Loder | Mar. 24, 1903 |
| 759,115 | Lackovic | May 3, 1904 |
| 1,155,555 | Edwards | Oct. 5, 1915 |
| 1,259,635 | Kint | Mar. 19, 1918 |
| 1,889,123 | Jones | Nov. 29, 1932 |
| 2,176,347 | Jansen | Oct. 17, 1939 |

FOREIGN PATENTS

| Number | Country | Date |
| --- | --- | --- |
| 284,408 | Great Britain | 1928 |